March 9, 1965 — J. W. WEBSTER — 3,172,170
COMPOSITE WOOD PANEL
Filed Sept. 18, 1961

INVENTOR.
JOHN W. WEBSTER
BY Schmieding and Fultz
ATTORNEYS

3,172,170
COMPOSITE WOOD PANEL
John W. Webster, Upper Arlington, Ohio, assignor to D. B. Frampton & Company, Columbus, Ohio, a corporation of Ohio
Filed Sept. 18, 1961, Ser. No. 138,878
1 Claim. (Cl. 20—91)

This invention relates to wood panels and particularly to composite panels of the type that are constructed from a plurality of panel components secured together by threaded metal dowels.

In general, the panel of the present invention is made up of a plurality of wood panel components disposed in side by side relationship. The assembled components are drilled from one edge of the panel to the other and, in accordance with the present invention, a light metal dowel formed of aluminum alloy or the like is provided with threads from one end tip to the other. The threads extend for their full diameter to the end tips of the dowel whereby the bores of the edge panel components are firmly gripped by threaded engagement with the tip ends of the dowel.

In accordance with the present invention the dowels are made such that the pitch diameter of the threads is equal to the bore diameter of the holes through the components whereby the crests of the threads bite into the walls of the bores for a depth substantially equal to one-half the depth of the threads. I have discovered that with this arrangement splitting of the panel components is completely eliminated.

Since the threads on the light metal dowels continue to the end tips of the dowels the end tips actually cut their way into the wood without wedging action as was the case with prior art dowel constructions wherein the lead end of the dowels are rounded and the root diameter of the threads on the dowels was substantially equal to the diameter of the bores through the panel components. Prior art dowels of this type are disclosed in United States Letters Patent 2,439,655 to Graham.

As another aspect of the present invention the confronting side surfaces of the panel components are slightly cambered inwardly whereby the clamping action of the threaded dowel as it cuts its way through the panel components draws the confronting edges of the components together whereby gaps in the faces of the panel are completely eliminated.

As still another aspect of the present invention the confronting faces of the panel components are provided with tongues and grooves that are joined together in light press fit engagement whereby stresses are uniformly transmitted from component to component.

Since the dowels are formed of light relatively soft metal the panels can be readily sawed even with conventional hand saws without forming a jagged sawed edge as was the case with prior art panels where it was necessary to simultaneously saw through hard wood and hard metal.

As another aspect of the present invention the confronting side surfaces of certain of the panel components are provided with longitudinally extending channels which channels serve to successively start the lead end of the dowels into each succeeding panel component whereby wandering of the drill is completely eliminated and the bores are formed centrally through all of the panel components. The longitudinally extending channels also serve the important function of releasing wood cuttings from the bores as they are being formed by the drill.

It is, therefore, an object of the present invention to provide an improved panel construction that includes threaded dowels formed of light relatively soft metal, the pitch diameter of said dowels being substantially equal to the diameter of the bores in which they are driven.

It is another object of the present invention to provide an improved panel construction that includes threaded dowels formed of light relatively soft metal that are threaded in full diameter from end tip to end tip whereby the end tips are in strong threaded engagement with the edge panel components throughout substantially the entire length of the bores.

It is another object of the present invention to provide an improved panel construction of the type described wherein the abutting side surfaces of the panel components are cambered slightly inwardly whereby gaps in the panel faces are avoided.

It is another object of the present invention to provide a panel construction of the type described wherein the abutting side surfaces of the panel components are provided with tongues and grooves in light press fit engagement.

It is another object of the present invention to provide an improved panel construction wherein the confronting side surfaces of the panel components are provided with longitudinally extending channels for releasing cuttings from the bores when the dowels are driven through the components.

It is another object of the present invention to provide an improved panel construction of the type described that includes threaded dowels formed of light relatively soft metal that can be readily sawed simultaneously with the hard wood in which they are disposed.

Further objects and advantages of the present invention will be apparent from the following description, reference being had to the accompanying drawings wherein a preferred form of embodiment of the invention is clearly shown.

Figures 1, 2, 3, 4, 5:
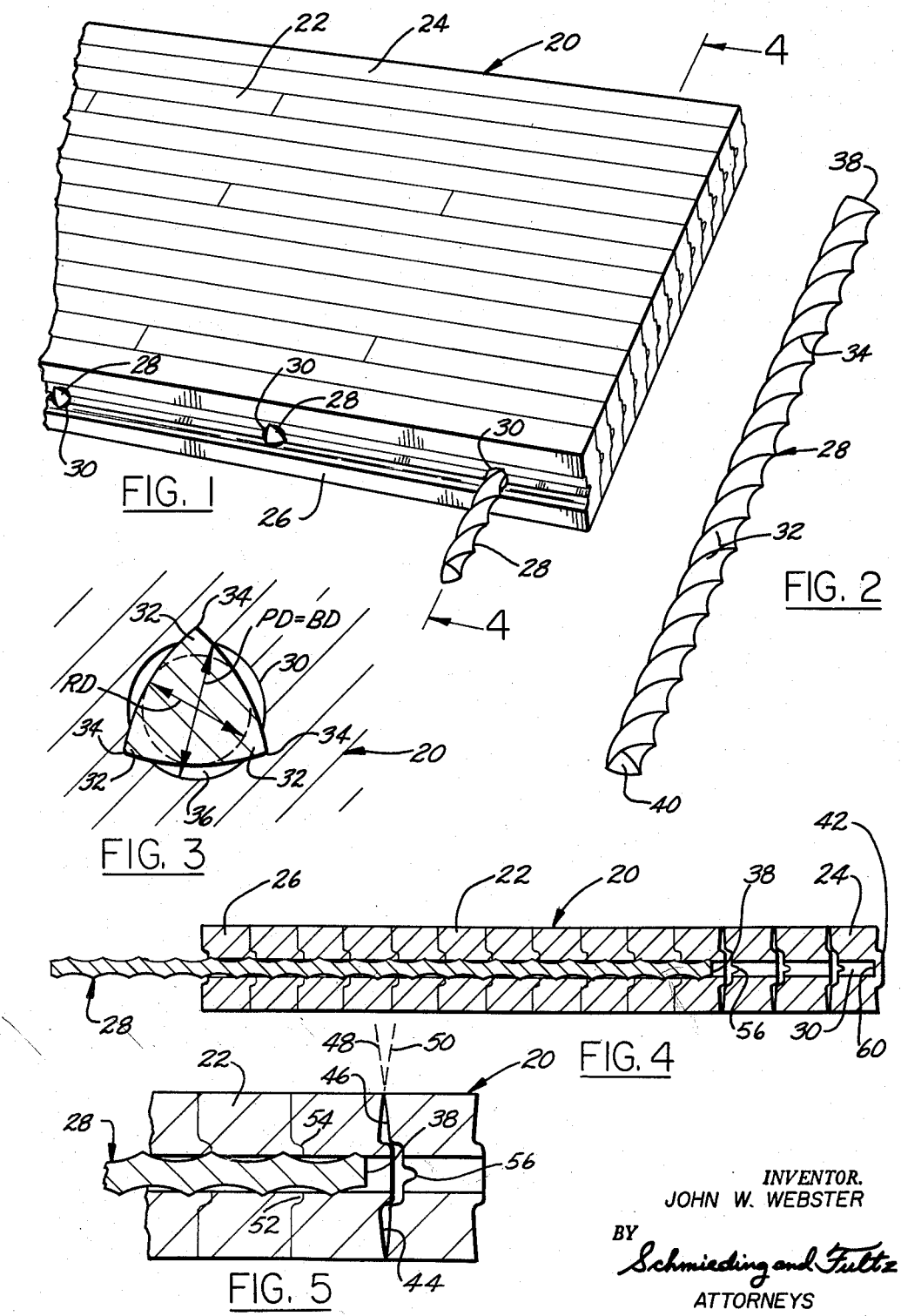
FIG. 1 is a partial perspective view of a composite panel constructed in accordance with the present invention.
FIG. 2 is a perspective view of a dowel formed in accordance with the present invention.
FIG. 3 is a partial end sectional view through the panel and dowel of the preceding figures.
FIG. 4 is an end sectional view of the panel and dowel of FIG. 1, the section being taken along the line 4—4 of FIG. 1.
FIG. 5 is a partial enlarged sectional view of the panel of the preceding figures, the section being taken along the line 4—4 of FIG. 1.

Referring in detail to the drawings a panel constructed in accordance with the present invention is indicated generally at 20 and includes a plurality of panel components one of which is indicated at 22.

The right and left edge panel components are designated 24 and 26. The components 22, 24, and 26 are joined together by a threaded dowel indicated generally at 28 that is formed of light relatively soft metal such as aluminum alloy, magnesium, or the like.

The panel components are provided with aligned bores 30 which are formed by drilling after the components are assembled in a jig.

As is best seen in FIGS. 2 and 3 dowel 28 includes a plurality of convolutions or threads 32 and the pitch diameter PD of the threads is substantially equal to the bore diameter BD whereby the crests 34 of the threads bite into the walls of the bores but the root diameter RD of the threads, being less than the diameter BD of the bores provides clearance spaces 36 for chips and distortion of the walls of the bores whereby splitting of the panel components is prevented.

It should be pointed out that the threads 32 extend in full diameter to the end tips 38 and 40 on the dowels whereby the leading edge of the dowel actually cuts its way through each succeeding panel component rather than wedging and expanding; and, moreover, the end tips of the dowels can be moved into engagement with substantially the entire length of the bores in each panel component 24 and 26 whereby these components are firmly retained in place.

In the preferred embodiment the drill, when forming bores 30, is stopped just short of the right side surface 42 of edge panel component 24. By preventing breakthrough of the drill an edge cleanup operation is eliminated.

As is best seen in the enlarged view of FIG. 5 the confronting side surfaces 44 and 46 of the panel components 22 are provided with a slight camber of approximately 1 degree, said camber being exaggerated in the drawings and represented by the camber angle lines 48 and 50.

The side surfaces of the panel components 22 are further provided with tongues 52 and grooves 54 disposed in light press fit engagement. A light hand press fit is found to be proper for the tongues and grooves.

Certain of the side surfaces of the panel components are provided with longitudinally extending channels 56 which form lead holes for the entry of the drill tip into each succeeding component when bores 30 are being formed. Channels 56 also perform the important function of releasing cuttings from bores 30 during the drilling operation. This makes it possible to form the blind bore 30 in each panel component 24.

In operation, the panel components 22, 24, and 26 are formed with tongues 52, grooves 54, channels 56 and chambers 48–50 in the side surfaces thereof. The components are next assembled in contiguous side by side relationship in a jig in hand press fit engagement.

Bores 30 are next formed through the assembled panel components with long drills. During the drilling operation, the channels 56 function as lead holes for starting the drill tip into each succeeding panel whereby straightness and accurate centering of the bores is constantly achieved.

The light relatively soft metal dowels are next properly positioned and driven into the bores by an appropriate machine of the general type disclosed in the United States Letters Patent No. 2,567,191 issued September 11, 1951. As the dowels are pressed into the bores the full diameter threads on end tips 38 of dowels 28 cut into each succeeding panel component until leading end tips 38 are driven home against the blind ends 60 of bores 30 in edge component 24.

Since the pitch diameter PD of threads 32 is substantially equal to the bore diameter D of the bores 30 only the crest 34 of the thread bite into the walls of the bores, for substantially one-half the thread depth, to provide clearance spaces 36 to accommodate hole wall distortion and chips without splitting the components.

While the form of embodiment of the present invention as herein disclosed constitutes a preferred form, it is to be understood that other forms might be adopted, all coming within the scope of the claim which follows.

I claim:

An improved panel construction comprising, in combination, a plurality of wood components disposed in contiguous side by side relationship to form an assembly including right and left edge components, said components including laterally extending aligned bores of substantially equal bore diameter; a metal dowel provided with crested threads extending in full crest diameter to the end tips of said dowel, said dowel being cut off at substantially right angles with respect to the longitudinal axis of said dowel whereby the end tips of said dowel are in threaded engagement with the bores in said edge components, the root diameter of said threads being less than the diameter of said bores and the crest diameter of said threads being greater than the diameter of said bore, said components including confronting inwardly cambered side surfaces provided with tongue and groove portions in tight press fit engagement, and longitudinally extending channels in certain of said portions, said channels communicating with said bores and being of lesser width than said portions whereby said channels form guides for drilling said bores and provide chip releasing areas.

References Cited in the file of this patent

UNITED STATES PATENTS

| | | |
|---|---|---|
| 145,221 | Maitre | Dec. 2, 1873 |
| 1,276,719 | Campbell | Aug. 27, 1918 |
| 1,891,895 | Nagel | Dec. 20, 1932 |
| 1,906,411 | Potvin | May 2, 1933 |
| 1,980,093 | Rosenberg | Nov. 6, 1934 |
| 2,117,198 | Megee | May 10, 1938 |
| 2,231,771 | Murphy | Feb. 11, 1941 |
| 2,439,655 | Graham | Apr. 13, 1948 |
| 2,650,395 | De Anguera | Sept. 1, 1953 |

FOREIGN PATENTS

| | | |
|---|---|---|
| 451,158 | France | Feb. 6, 1913 |
| 987,047 | France | Apr. 11, 1951 |
| 42,819 | Norway | May 10, 1926 |
| 530,280 | Great Britain | Dec. 9, 1940 |